United States Patent
Aldana et al.

(10) Patent No.: US 12,041,658 B1
(45) Date of Patent: Jul. 16, 2024

(54) SYSTEMS AND METHODS FOR PERFORMING COEXISTENCE OPERATIONS IN WIRELESS SPECTRUMS

(71) Applicant: Meta Platforms Technologies, LLC, Menlo Park, CA (US)

(72) Inventors: Carlos Horacio Aldana, Mountain View, CA (US); Sam Padinjaremannil Alex, Dublin, CA (US); Abhishek Kumar Agrawal, Bellevue, WA (US); Claudio Da Silva, Portland, OR (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 198 days.

(21) Appl. No.: 17/679,917

(22) Filed: Feb. 24, 2022

Related U.S. Application Data

(60) Provisional application No. 63/165,289, filed on Mar. 24, 2021.

(51) Int. Cl.
   *H04W 74/0816* (2024.01)
   *H04W 72/1263* (2023.01)
   *H04W 74/08* (2009.01)

(52) U.S. Cl.
   CPC ... *H04W 74/0816* (2013.01); *H04W 72/1263* (2013.01); *H04W 74/0866* (2013.01)

(58) Field of Classification Search
   CPC ......... H04W 74/0816; H04W 72/1263; H04W 74/0866
   See application file for complete search history.

(56) References Cited

U.S. PATENT DOCUMENTS

| | | | |
|---|---|---|---|
| 2005/0226312 A1* | 10/2005 | Koslar | H04B 1/69 375/150 |
| 2006/0223448 A1 | 10/2006 | Kruys | |
| 2007/0264939 A1* | 11/2007 | Sugar | H04B 17/309 455/67.11 |
| 2016/0124421 A1* | 5/2016 | Hansell | H04B 3/56 700/286 |
| 2018/0115996 A1* | 4/2018 | Si | H04W 74/0808 |
| 2019/0191460 A1* | 6/2019 | Chendamarai Kannan | H04W 74/0816 |
| 2019/0230706 A1* | 7/2019 | Li | H04B 7/0639 |
| 2019/0391247 A1* | 12/2019 | Gulati | G01S 7/0232 |
| 2020/0092056 A1* | 3/2020 | Lei | H04L 5/0012 |
| 2021/0259016 A1* | 8/2021 | Damnjanovic | H04W 24/10 |
| 2022/0140941 A1* | 5/2022 | Gulati | H04L 1/0028 370/328 |
| 2023/0015536 A1* | 1/2023 | Goyal | H04B 7/0695 |

OTHER PUBLICATIONS

International Search report and Written Opinion for International Application No. PCT/US2022/021051, mailed Jul. 13, 2022, 8 pages.

* cited by examiner

*Primary Examiner* — Ajay Cattungal
(74) *Attorney, Agent, or Firm* — Foley & Lardner LLP

(57) ABSTRACT

Systems and methods for performing listen-before-talk (LBT) operations include a first wireless communication device which schedules a data burst comprising a plurality of chirps for transmitting on a channel to a second device. The wireless communication device may perform an LBT operation on the channel between the first device and the second device to determine that the channel is available, prior to transmitting a first chirp of the plurality of chirps. The wireless communication device may transmit the first chirp on the channel responsive to performing the LBT operation.

19 Claims, 18 Drawing Sheets

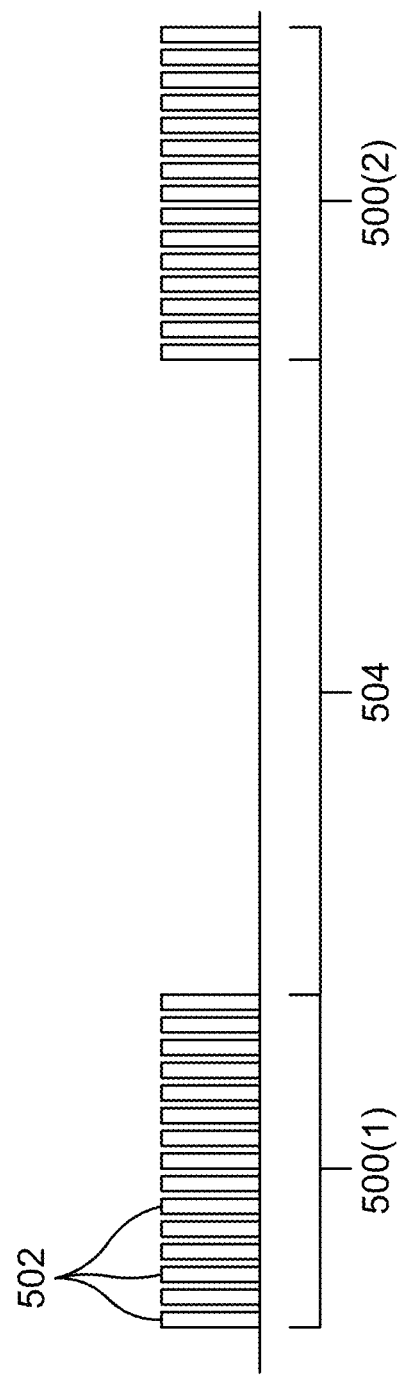

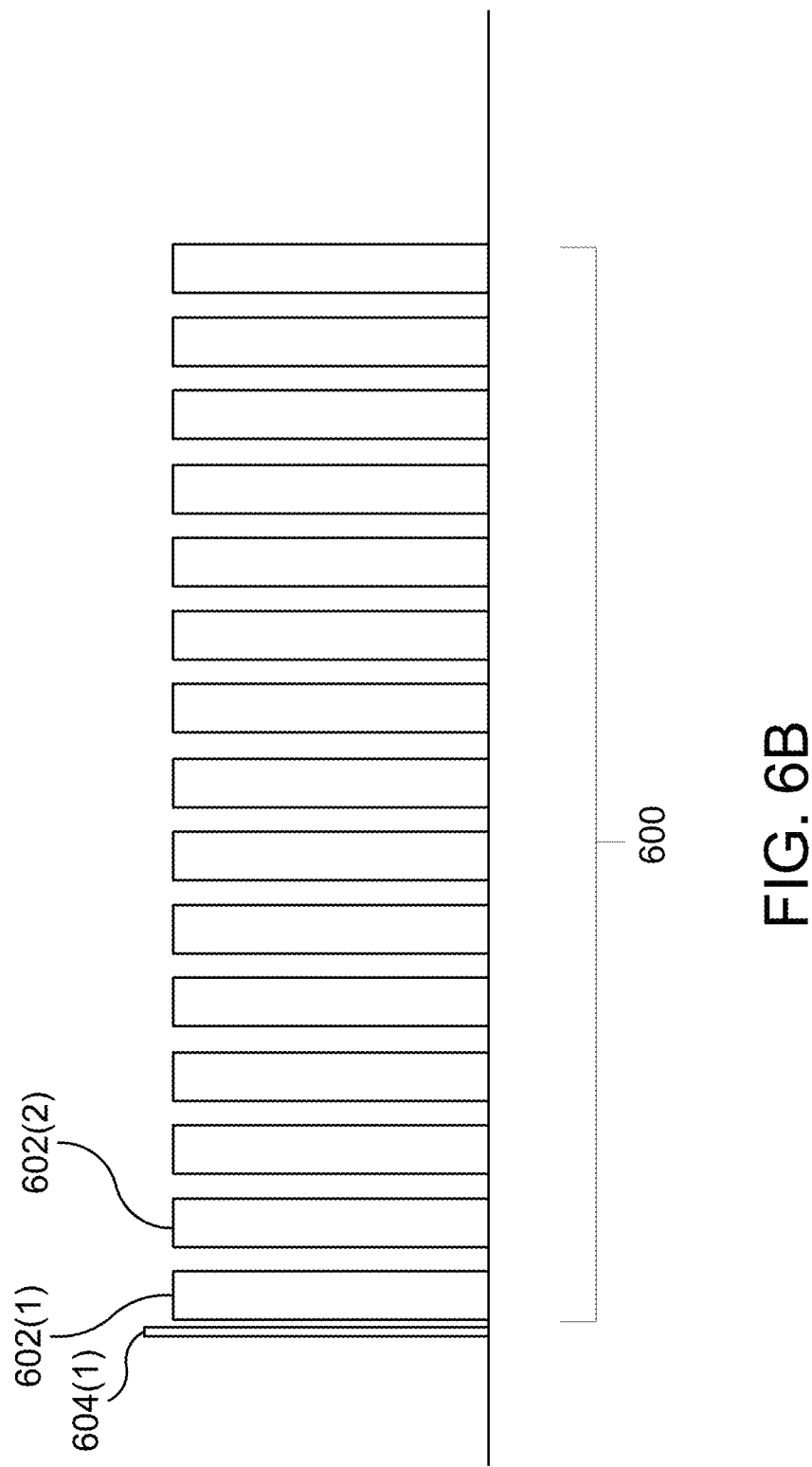

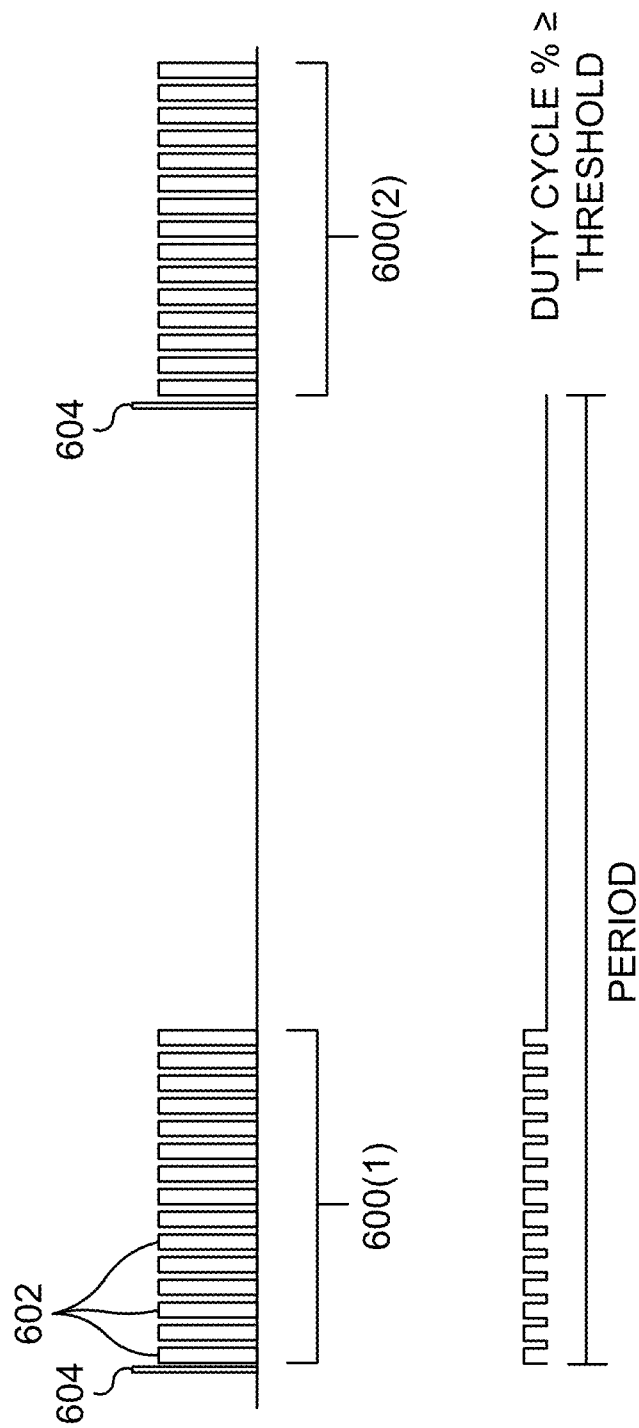

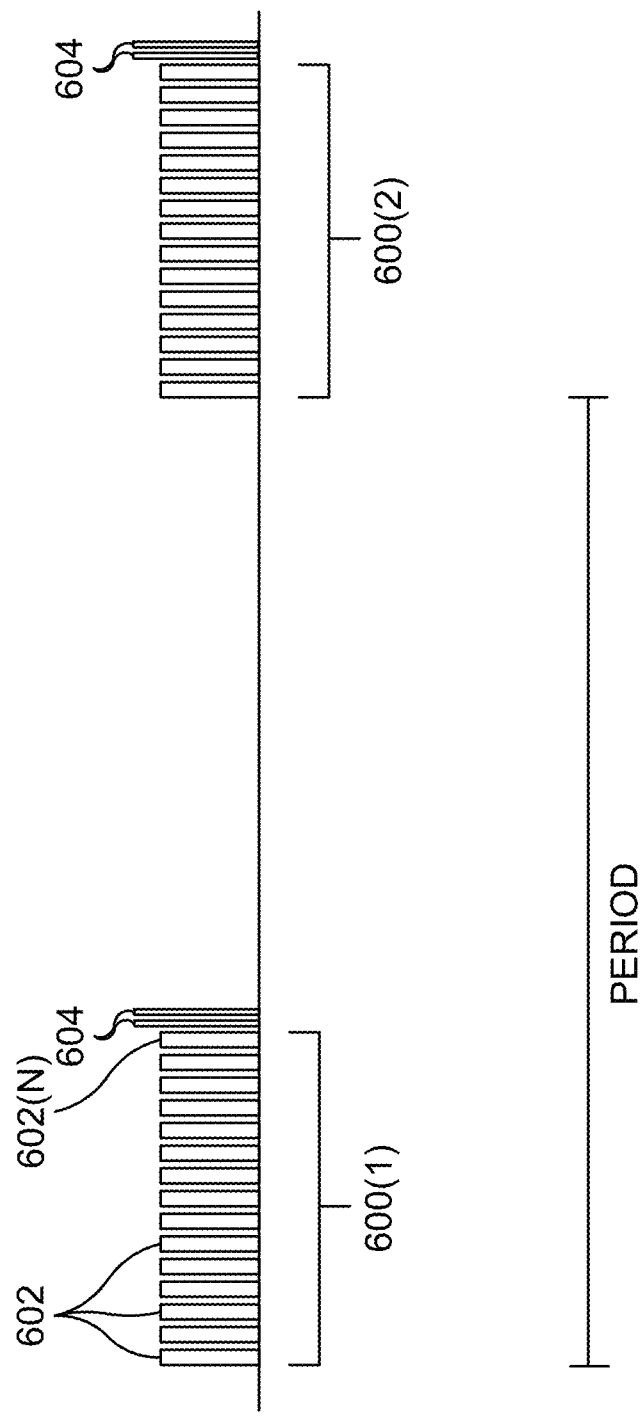

SYSTEMS AND METHODS FOR PERFORMING COEXISTENCE OPERATIONS IN WIRELESS SPECTRUMS

CROSS-REFERENCE TO RELATED APPLICATIONS

This application claims the benefit of and priority to U.S. Application No. 63/165,289, filed Mar. 24, 2021, the contents of which are incorporated by reference in their entirety.

FIELD OF DISCLOSURE

The present disclosure is generally related to systems and method of communication with certain latency requirements, including but not limited to managing communication in artificial reality and other applications.

BACKGROUND

Wireless devices may perform ranging or data communication on channels within various wireless spectrums, such as the 60 GHz band. Some devices may perform ranging or data communications by sending bursts to other devices in an environment. Where multiple devices are located in the same environment and operating within the same wireless spectrum, communications between such devices may cause interference with other devices.

SUMMARY

In one aspect, this disclosure is directed to a method. The method may include scheduling, by a first wireless communication device, a data burst comprising a plurality of chirps for transmitting on a channel to a second device. The method may include performing, by the first wireless communication device, a listen-before-talk (LBT) operation on the channel between the first wireless communication device and the second device to determine that the channel is available, prior to transmitting a first chirp of the plurality of chirps. The method may include transmitting, by the first wireless communication device, the first chirp on the channel responsive to performing the LBT operation.

In some embodiments, the method may further include performing, by the first wireless communication device, a second LBT operation on the channel following the transmitting of the first chirp and prior to transmitting a second chirp of the plurality of chirps. The method may further include transmitting, by the first wireless communication device, the second chirp of the plurality of chirps responsive to performing the second LBT function. In some embodiments, the method may further include performing, by the first wireless communication device, a respective LBT operation on the channel prior to transmitting each of the plurality of chirps of the data burst.

In some embodiments, performing the LBT function prior to transmitting the first chirp includes performing up to a predefined number of LBT operations on the channel to determine that the channel is available, prior to transmitting the first chirp of the plurality of chirps. In some embodiments, transmitting the first chirp on the channel includes transmitting the data burst including each of the plurality of chirps on the channel, responsive to determining that the channel is available. In some embodiments, the method includes determining, by the first wireless communication device, a duty cycle for the data burst. The LBT operation may be initiated based on the duty cycle for the data burst.

In some embodiments, the method includes comparing, by the first wireless communication device, the duty cycle to a threshold, wherein the LBT function is initiated responsive to the duty cycle being greater than or equal to the threshold.

In some embodiments, transmitting the first chirp on the channel responsive to performing the LBT function includes transmitting, by the first wireless communication device, the first chirp on the channel responsive to determining that the channel is clear of interference within a threshold criteria. In some embodiments, performing the LBT function on the channel between the first wireless communication device and the second device is based on a beam width for the first wireless communication device satisfying a threshold criteria. In some embodiments, the data burst is a first data burst comprising a first plurality of chirps. The method may further include scheduling, by the first wireless communication device, a second data burst comprising a second plurality of chirps for transmitting on the channel. In some embodiments, the method further includes performing, by the first wireless communication device, a second LBT operation on the channel between the first wireless communication device and the second wireless communication device. The method may include transmitting, by the first wireless communication device, at least one of the second plurality of chirps on the channel responsive to determining that the channel is available. In some embodiments, the method includes transmitting, by the first wireless communication device, at least one of the second plurality of chirps on the channel, responsive to performing the LBT operation to determine that the channel is available prior to transmitting the first chirp of the first plurality of chirps.

In another aspect, this disclosure is directed to a first device. The first device may include a wireless communication device configured to communicate data with a second device located in an environment of the first device. The first device may include one or more processors. The one or more processors may be configured to schedule a data burst comprising a plurality of chirps for transmitting on a channel to the second device. The one or more processors may be configured to perform a listen-before-talk (LBT) operation on the channel between the first device and the second device to determine that the channel is available, prior to transmitting a first chirp of the plurality of chirps. The one or more processors may be configured to transmit, via the wireless communication device, the first chirp on the channel responsive to performing the LBT operation.

In some embodiments, the one or more processors are further configured to perform a respective LBT operation on the channel prior to transmitting each of the plurality of chirps of the data burst. The one or more processors may be further configured to transmit, via the wireless communication device, each of the plurality of bursts to the second device responsive to performing the respective LBT operation on the channel. In some embodiments, performing the LBT function prior to transmitting the first chirp includes a performing up to a predefined number of LBT operations on the channel to determine that the channel is available, prior to transmitting the first chirp of the plurality of chirps. In some embodiments, transmitting the first chirp on the channel includes transmitting the data burst including each of the plurality of chirps on the channel, responsive to determining that the channel is available.

In some embodiments, the one or more processors are configured to determine a duty cycle for the data burst, and compare the duty cycle to a threshold. The LBT function may be initiated responsive to the duty cycle being greater than or equal to the threshold. In some embodiments, transmitting the first chirp on the channel responsive to performing the LBT function includes transmitting, via the wireless communication device, the first chirp on the channel responsive to determining that the channel is clear of interference within a threshold criteria. In some embodiments, performing the LBT function on the channel between the first device and the second device is based on a beam width for the first device satisfying a threshold criteria.

In another aspect, this disclosure is directed to a non-transitory computer readable medium storing instructions that, when executed by one or more processors, cause the one or more processors to schedule, for a first wireless communication device, a data burst comprising a plurality of chirps for transmitting on a channel to a second device. The instructions may further cause the one or more processors to perform a listen-before-talk (LBT) operation on the channel between the first device and the second device to determine that the channel is available, prior to transmitting a first chirp of the plurality of chirps. The instructions may further cause the one or more processors to transmit, via the first wireless communication device, the first chirp on the channel responsive to performing the LBT operation.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 5 is an example diagram/representation of a series of bursts transmitted by a device, according to an example implementation of the present disclosure.

FIG. 6A-FIG. 6G are various example representations of transmission schedules in which a device may perform listen-before-talk (LBT) operations, according to example implementations of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section A discloses an artificial reality system which may be useful for practicing embodiments described herein;

Section B discloses a computing system which may be usable to implement aspects of the present disclosure; and Section C discloses systems and methods for coexistence operations.

A. Artificial Reality System

Figure 1:
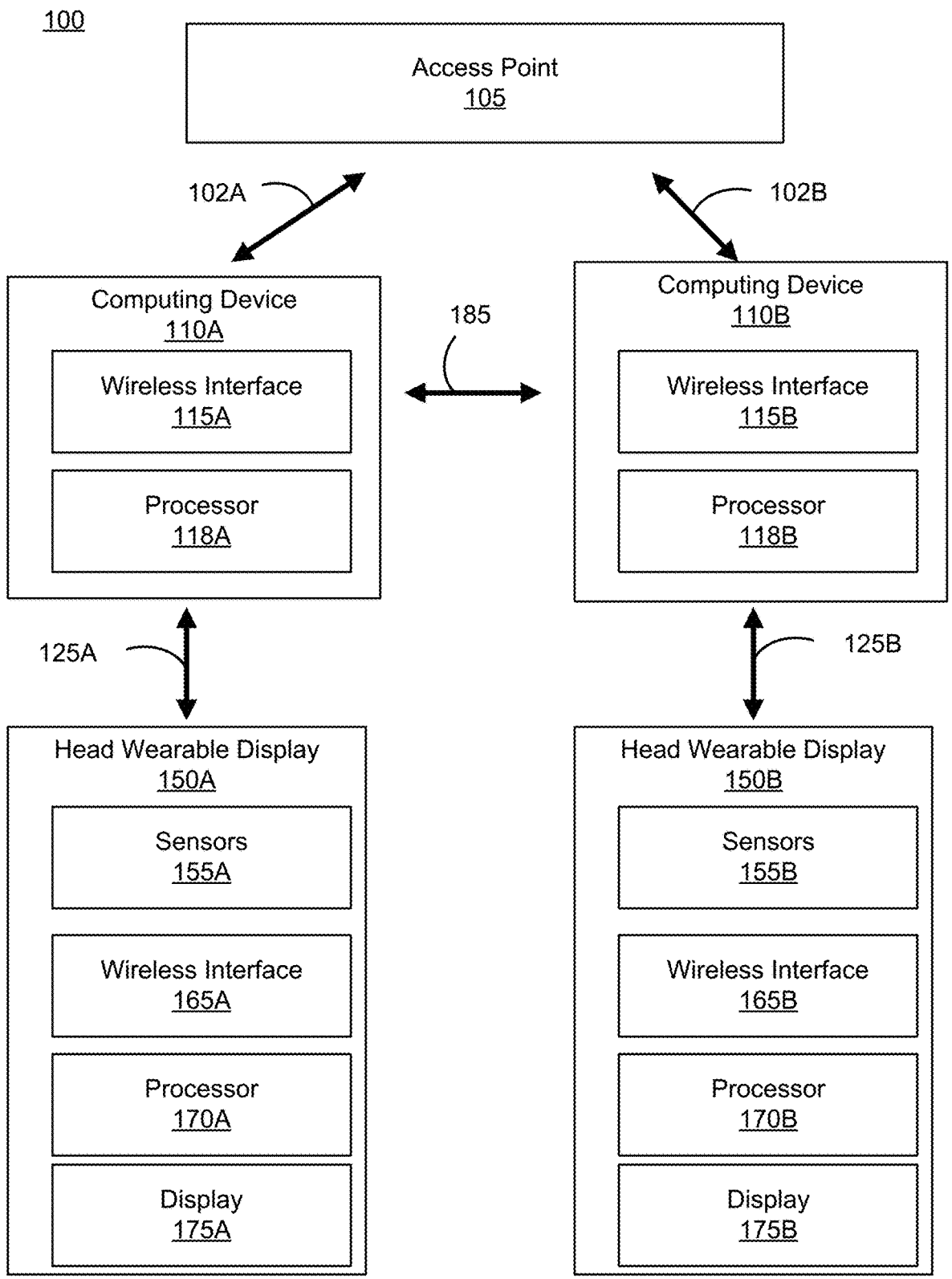
FIG. 1 is a diagram of a system environment including an artificial reality system, according to an example implementation of the present disclosure.

Disclosed herein are systems and methods for facilitating distribution of artificial reality (e.g., augmented reality (AR), virtual reality (VR), or mixed reality (MR)) content. FIG. 1 is a block diagram of an example artificial reality system environment 100. In some embodiments, the artificial reality system environment 100 includes a head wearable display (HWD) 150 worn by a user, and a console 110 providing content of artificial reality to the HWD 150. The HWD 150 may detect its location and/or orientation of the HWD 150, and provide the detected location/or orientation of the HWD 150 to the console 110. The console 110 may generate image data indicating an image of the artificial reality according to the detected location and/or orientation of the HWD 150 as well as a user input for the artificial reality, and transmit the image data to the HWD 150 for presentation.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming, for an example, that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming, for another example, that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110, or a combination of them, may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation, and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming, for an example, that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location, and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location, and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space, and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location, and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location, and an orientation of the HWD 150 in a physical space into a virtual space (or simultaneous localization and mapping (SLAM) data), motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 is a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
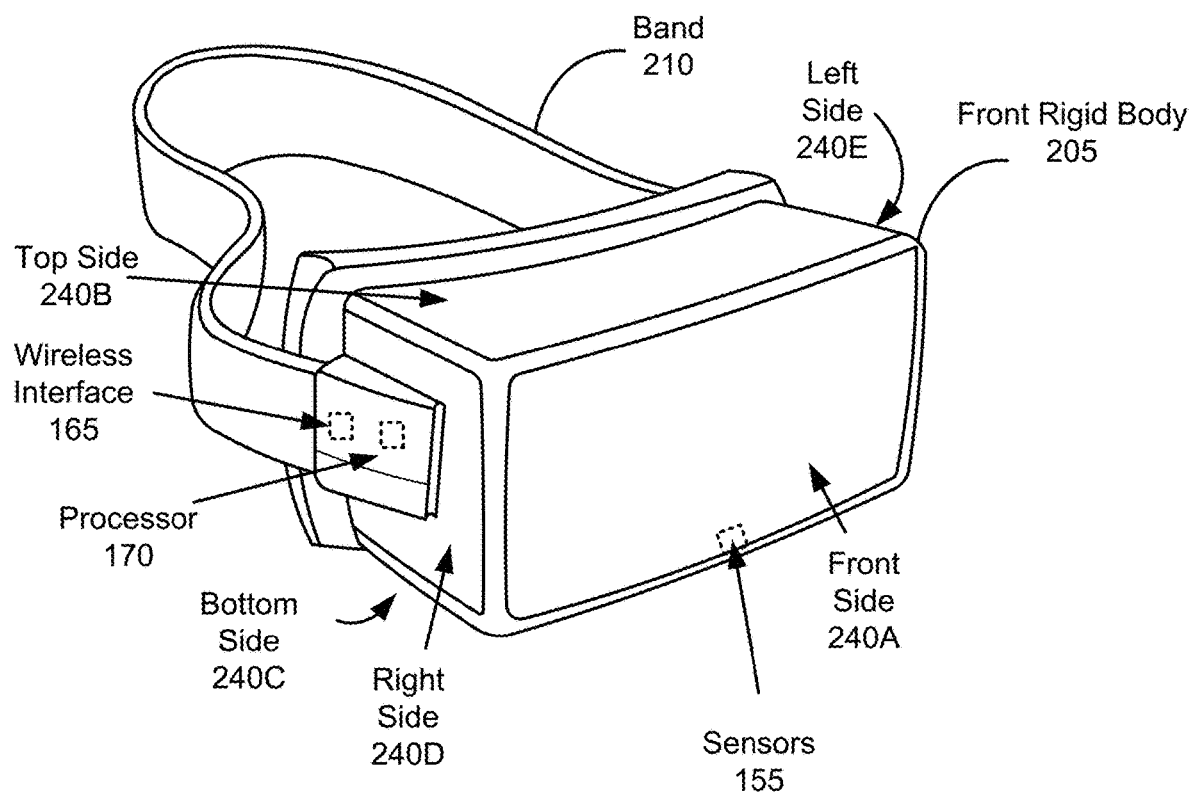
FIG. 2 is a diagram of a head mounted display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2. In some embodiments, the HWD 150 may include a plurality of communications interfaces 165. Similarly, the console 110 of FIG. 1 may include a plurality of communications interfaces 115. As described in greater detail below in section B, the communications interface(s) 115, 165 may be configured to selectively perform beamforming to optimize the communications channel between the console 110 and HWD 150. Similarly, the console 110 and HWD 150 may dynamically and intelligently switch between active and idle communications interface(s) 115, 165 to optimize the communications channel between the console 110 and HWD 150.

B. Computing System

Figure 3:
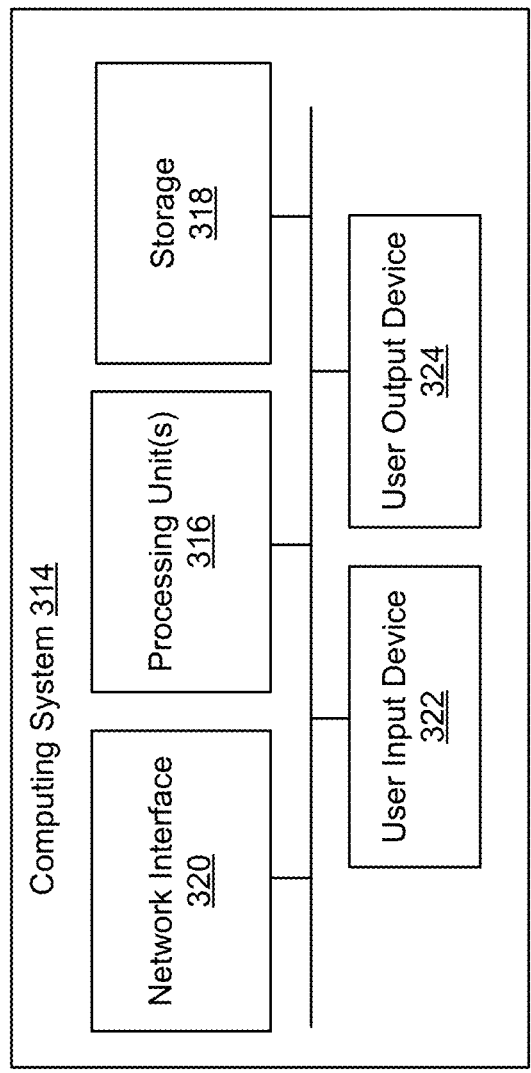
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 314 can be implemented to provide VR, AR, or MR experiences. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse, or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, (e.g., a liquid crystal display (LCD)), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations (e.g., by programming a processor or providing appropriate control circuitry) and various blocks might or might not be reconfigurable depending on how the initial configuration is obtained. Implementations of the present disclosure can be realized in a variety of apparatuses including electronic devices implemented using any combination of circuitry and software.

C. Systems and Methods for Performing Coexistence Operations

In some embodiments, the 60 GHz spectrum or band (sometimes referred to as V band) may be used for wireless communications (e.g., to support/enable the applications described herein, such as artificial reality applications). The 60 GHz spectrum or band may include a range proximate to 60 GHz, such as 57 GHz to 71 GHz, 57 GHz to 64 GHz, or 60 GHz to 64 GHz, or some other range. In some embodiments, the 60 GHz spectrum can be used for applications associated with Wi-Fi (e.g., based on the IEEE 802.11ad standard). In some embodiments, the 60 GHz spectrum is used for 5G and 6G cellular communications. The 60 GHz spectrum or band is sometimes referred to as an unlicensed or shared band, and therefore fair co-existence between devices in this band is important to ensure effective operation of devices in this band.

In some aspects, the present disclosure is directed to systems and methods for facilitating coexistence between devices in the 60 GHz band. The systems and methods may incorporate aspects of Listen Before Talk (LBT) operations which is sometimes referred to as Listen Before Transmits. LBT can be used as a technique for a device to determine whether a network or channel (e.g., free or unoccupied/unused channel) is available/clear for the device to transmit/use. A radio transmitter, transceiver, or other wireless communication device can first sense or detect its radio environment (e.g., channel or band) following the scheduling of a transmission and prior to starting a transmission. By performing a LBT operation, a wireless communication device can avoid collision with (e.g., interference from signals of) transmission(s) of other device(s) in the same channel/band/network.

In accordance with the systems and methods disclosed herein, a device may schedule a data burst comprising a plurality of chirps for transmitting on a channel to a second device. The device may perform a listen-before-talk (LBT) operation on the channel between the first device and the second device, prior to transmitting a first chirp of the plurality of chirps. The device may transmit the first chirp on the channel responsive to performing the LBT operation. Such implementations and embodiments may decrease interference or collisions between other devices located in an environment of the first device which may be operating in the 60 GHz band.

Figure 4:
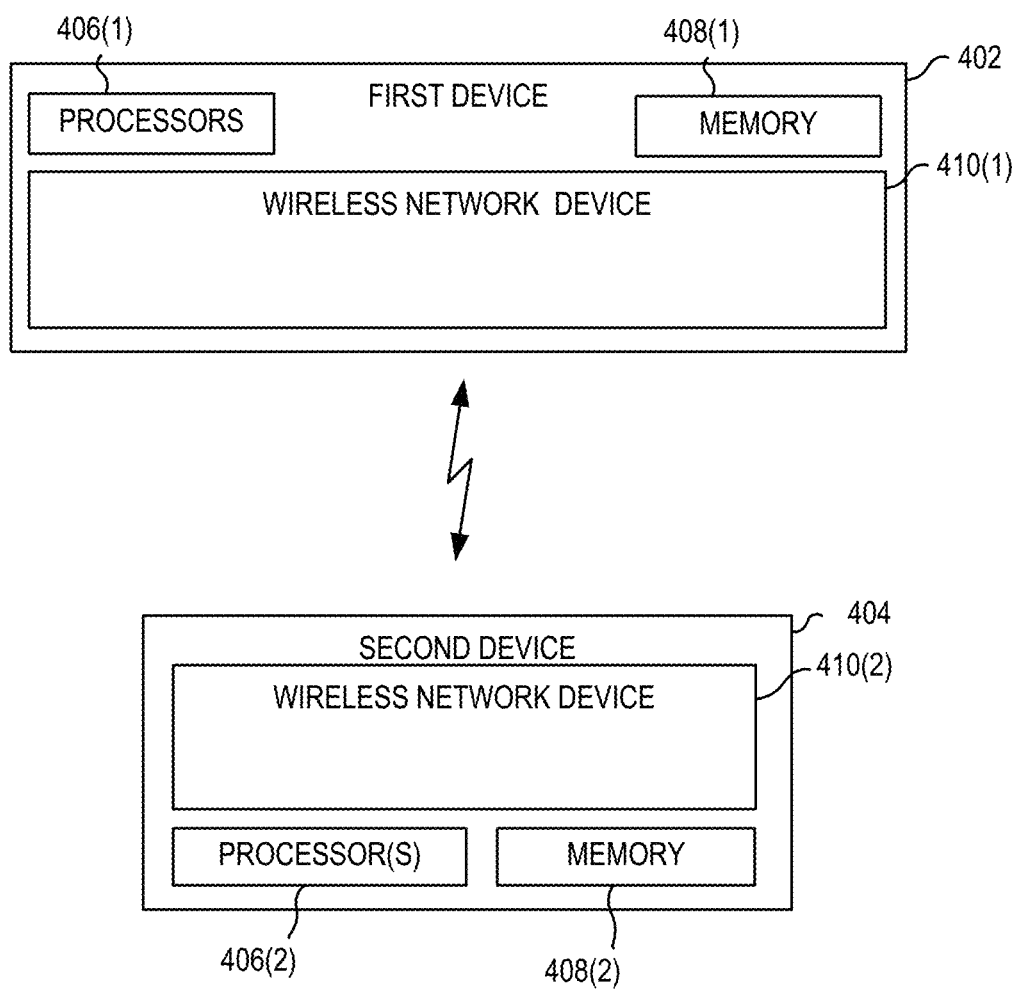
FIG. 4 is a block diagram of a system including a first device and a second device, according to an example implementation of the present disclosure.

Referring now to FIG. 4, depicted is a system 400 including a first device 402 and a second device 404. The devices 402, 404 may be similar to the devices described above with reference to FIG. 1-FIG. 3 above, or FIG. 9-FIG. 12 below. The devices 402, 404 may each include one or more processor(s) 406, memory 408 and a wireless network device 410. The processor(s) 406 may be similar to the processors 118, 170 described above with reference to FIG. 1 and FIG. 2, or processing unit(s) 316 described above with reference to FIG. 3. The memory 408 may be similar to storage 318 described above with reference to FIG. 3. The wireless network device 410 may be similar to the wireless interface 115, 165 described above with reference to FIG. 1 and FIG. 2, or network interface 320 described above with reference to FIG. 3.

In some embodiments, the wireless network device 410 may be configured to transmit communications on channels within or otherwise operate on the 60 GHz band or spectrum. In some embodiments, the wireless network device 410 may be configured to operate within a range proximate to 60 GHz, such as 57 GHz to 71 GHz, 57 GHz to 64 GHz, or 60 GHz to 64 GHz, or some other range. In some embodiments, the devices 402, 404 may be configured to operate the wireless network device 410 for Wi-Gig applications associated with Wi-Fi (e.g., based on the IEEE 802.11ad standard). In some embodiments, the devices 402, 404 may be configured to operate the wireless network device 410 for 5G and 6G cellular communications. In some embodiments, the devices 402, 404 may be configured to operate the wireless network device 410 (e.g., as radar) for ranging or orientation determination. Various examples of such operations are described with reference to FIG. 9-FIG. 12 below.

The first device 402 and second device 404 may be configured to determine, establish, or otherwise negotiate a channel on which the devices 402, 404 are to exchange burst transmissions. In some embodiments, the first device 402 and second device 404 may be configured to negotiate the channel within the 60 GHz band. The first device 402 and second device 404 may be configured to negotiate the channel responsive to executing a pairing procedure, as part of initializing or start-up, responsive to the devices 402, 404 being turned on after being successfully paired, etc. The first device 402 and second device 404 may be configured to negotiate the channel by performing one or more handshake operations, frequency hopping, etc., to determine an open, unused, or otherwise available channel within the 60 GHz band.

Referring now to FIG. 4 and FIG. 5, the devices 402, 404 may be configured to communicate, send, or otherwise transmit data bursts on a negotiated channel with other devices 402, 404 located in an environment. Specifically, FIG. 5 shows a series of bursts 500 transmitted by a device, according to an example implementation of the present disclosure. The bursts 500 may be sent as part of a data transmission schedule or fixed frame period (FFP) which includes the bursts 500 (or observation period) and an idle period (e.g., following the burst 500 or observation period). As shown in FIG. 5, each burst 500 may include a plurality of chirps 502. The chirps 502 may be or include radar signals, repeat transmissions of the same data, may be segmented portions of data, etc. In some embodiments, a burst 500 may include 15 chirps 502, though the bursts 500 may each include any number (e.g., fixed, dynamic, etc.) of chirps 502 (e.g., 10 chirps, 20 chirps, etc.). The observation period may be a portion or percentage of the fixed frame period. For example, the observation period may be approximately 50% of the fixed frame period.

Various standards may define or otherwise set parameters for the data burst 500 (for example, duty cycle, chirp 502 width, number of bursts within a time frame, number of chirps 502 per burst 500, chirp 502 on/off time, etc.). For instance, while not shown to scale, the data transmission schedule including the bursts 500 may include one burst per a fixed frame period (FFP), which may be 33 milliseconds (ms), 20 chirps per burst, a chirp width of 130.8 microseconds (μs), a chirp off time of 200 μs, and/or a chirp on/off time of 330.8 μs. As such, the duty cycle may be equal to the total on time (e.g., chirp width [130.8 μs] multiplied by number of chirps [20], or 2616.0 μs) divided by the total period of the data transmission schedule (e.g., 33 ms), or 7.9% duty cycle. However, some proposed standards may include higher duty cycles, for example up to 20% duty cycle. By having a greater duty cycle, there may be an increased likelihood of (e.g., susceptibility to) interference between/from devices within the environment.

In some embodiments, the devices 402, 404 may use different duty cycles based on positional data to be obtained relating to the second device. For example, the devices 402, 404 may use a first duty cycle for obtaining location or ranging data relating to the second device (e.g., during the observation period). The devices 402, 404 may use a second duty cycle for obtaining velocity data relating to the second device. In some embodiments, for performing ranging, the devices 402, 404 may use short duration chirps (e.g., less than 3.3 ms) or multiple chirps that span greater than some defined frequency (e.g., 2.16 GHz) with a fixed, determined, or defined duty cycle. Additionally, the radar off-time between two successive radar pulses may be less than 2 ms (e.g., for computing duty cycle). For velocity estimation, the devices 402, 404 may use a single channel (e.g., 2.16 GHz channel, or channel 1). In this example, the duty cycle may be increased up to 100% (e.g., any value between 20% and 100%), for instance.

Referring back to FIG. 4, in some embodiments, the devices 402, 404 may be configured to establish, generate, determine, or otherwise schedule a data or burst transmission to other devices 402, 404 in the environment. For instance, the first device 402 may be configured to schedule a burst transmission to the second device 404 in the environment (or vice versa). The first device 402 may be configured to schedule a burst transmission as part of ranging or orientation determination, as part of data communication or transmission, etc. Prior to transmitting data, the first device 402 may be configured to perform one or more listen-before-talk (LBT) operations. The first device 402 may be configured to perform an LBT operation on a channel established or negotiated between the first device 402 and second device 404. For example, the first device 402 may be configured to perform the LBT operations on the channel which was negotiated between the first device 402 and second device 404, prior to transmitting a data burst (e.g., a series of (on and off) transmissions within a duration or proximate to each other) to the second device 404. Various examples of performing LBT operations are described with reference to FIG. 6A-FIG. 6G.

The first device 402 may be configured to perform the LBT operations on the channel as part of a clear channel assessment (CCA). In other words, the first device 402 may be configured to perform LBT operations on the channel to determine that the channel is clear of interference within a threshold criteria. For example, as part of performing an LBT operation, the first device 402 may be configured to identify/detect or "listen" for any data communications or transmissions from other devices within an environment of the first device 402 which may be operating on channels which are close in frequency to the channel between the first and second device 402, 404. The first device 402 may detect interference where another device is transmitting data on a frequency or channel which is close in frequency to the negotiated channel between the first and second device 402, 404. The first device 402 may be configured to compare, for example, a signal strength (such as a received signal strength indication [RSSI]) or other parameter of the detected interference to a threshold level (such as an ED threshold level). The first device 402 may be configured to determine that the channel is clear of interference responsive to the signal strength of the detected interference being less than or equal to the threshold signal strength (or otherwise satisfying a threshold criteria). Where the first device determines that the signal strength of the detected interference does not satisfy the threshold criteria, the first device 402 may be configured to negotiate a different channel with the second device 404, to avoid interference or collisions with other devices in the environment.

Referring now to FIG. 6A-FIG. 6G, depicted are various examples in which a device (such as the first device 402 or second device 404) may perform LBT operations, according to example implementations of the present disclosure. As shown in FIG. 6A-FIG. 6G, and according to one or more embodiments, the device 402, 404 may be configured to perform one or more LBT operations 604 between transmitting (e.g., each adjacent pair of) chirps 602 within a burst 600, prior to transmitting a data burst 600, between transmitting two data bursts 600, etc. Such implementations and embodiments may provide more fidelity about availability of the channels between the device 402, 404 by detecting other transmissions and avoiding interference on the channels while satisfying standards relating to the channel. While described hereinafter as the first device 402 performing LBT operations as part of transmitting data bursts 600 to the second device 404, it is noted that the second device 404 may similarly perform LBT operations as part of transmitting data bursts to the first device 402.

Figure 6A:
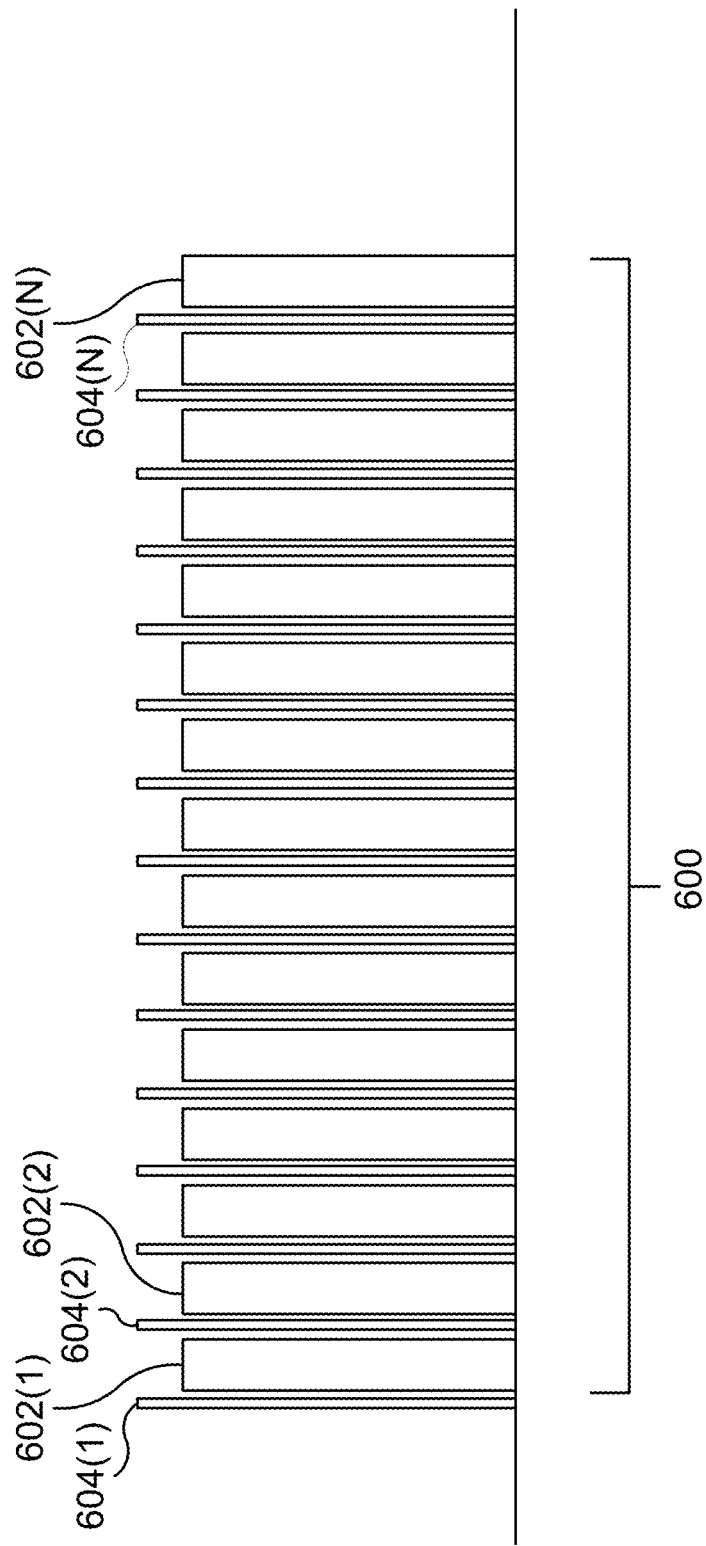

Referring specifically to FIG. 6A, in some embodiments, the first device 402 may be configured to perform one or more LBT operations 604 within, during, or as part of transmitting chirps 602 of a data burst 600. In some embodiments, the first device 402 may be configured to perform a respective LBT operation 604 prior to transmitting each chirp 602 of a data burst 600. The first device 402 may be configured to perform an LBT operation 604 for each chirp 602 of a burst 600. As shown in FIG. 6A, the first device 402 may be configured to perform a first LBT operation 604(1) prior to transmitting a first chirp 602(1) of the burst 600. When the first device 402 determines that the channel is free from interference from other transmission(s) (or detected level of interference satisfies a threshold criteria), the first device 402 may be configured to transmit the first chirp 602(1) of the burst 600 on the channel to the second device 404. Following transmitting the first chirp 602(1) and prior to transmitting a second chirp 602(2) of the burst 600, the first device 402 may be configured to perform a second LBT operation 604(2). When the first device 402 determines that the channel is free from interference from other transmission (s) (or detected level of interference satisfies a threshold criteria), the first device 402 may be configured to transmit the second chirp 602(2) of the burst 600 on the channel to the second device 404. The first device 402 may be configured to repeat LBT operations 604 for each of the N number of chirps of the burst 600. As such, in the example embodiment shown in FIG. 6A, the first device 402 may be configured to perform an equal number of LBT operations 604 as number of chirps 602 in a burst 600.

Figure 6C:
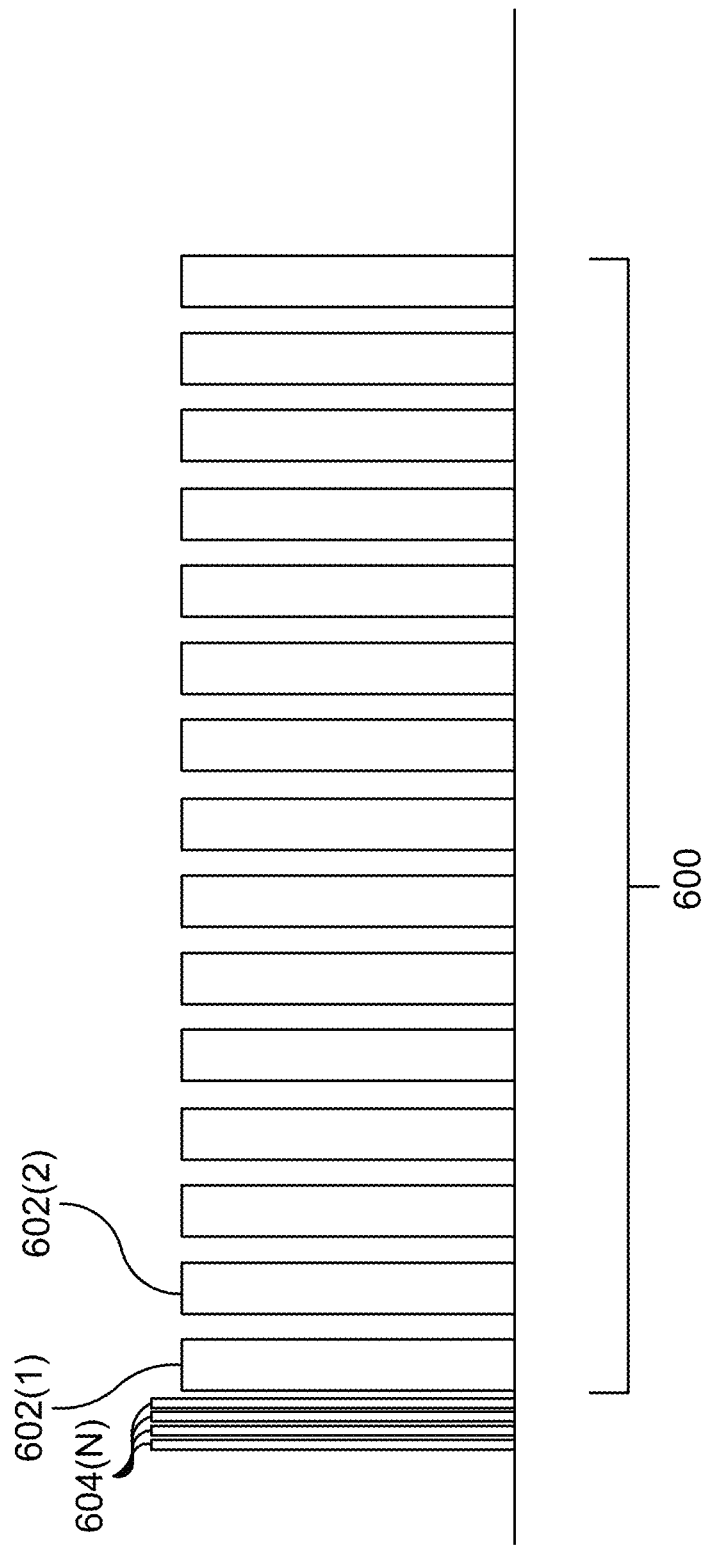

Referring specifically to FIG. 6B and FIG. 6C, in some embodiments, the first device 402 may be configured to perform one or more LBT operations 604 on the channel prior to transmitting a data burst 600. In some embodiments, and as shown in FIG. 6B, the first device 402 may be configured to perform a single LBT operation 604 on the channel prior to transmitting a data burst 600. In some embodiments, and as shown in FIG. 6C, the first device 402 may be configured to perform a plurality (or up to N number) of LBT operations 604 on the channel prior to transmitting a data burst 600 (e.g., in an attempt to obtain/locate/detect and/or monitor for a clear channel for transmission, by performing up to N LBT attempts if previous attempts are unsuccessful in detecting a clear channel). When the first device 402 determines that the channel is free from interference (or detected interference satisfies a threshold criteria), the first device 402 may be configured to transmit the burst 600 on the channel to the second device 404. The first device 402 may be configured to transmit each of the chirps 602 of the data burst 600 responsive to determining (via one or more LBT operations) that the channel is free from interference (e.g., transmission(s) from other device(s)). In other words, the first device 402 may be configured to transmit a full burst 600 (including each of the chirps 602 of the burst 600) responsive to performing one or more LBT operations 604 prior to the first chirp 602(1) of the burst 600.

Referring specifically to FIG. 6D, in some embodiments, the first device 402 may be configured to perform one or more LBT operations 604 on the channel based on one or more metrics. In the embodiment shown in FIG. 6D, the first device 402 may be configured to perform one or more LBT operations 604 based on a duty cycle. For example, the first device 402 may be configured to determine/estimate/calculate a duty cycle for the FFP in which the device 402 is performing transmissions. The first device 402 may be configured to compare the duty cycle to a threshold duty cycle. The first device 402 may be configured to perform one or more LBT operations 604 responsive to the duty cycle satisfying a threshold criteria (e.g., the duty cycle being greater than or equal to a percentage duty cycle). The first device 402 may be configured to perform the one or more LBT operations to detect a clear/available channel, prior to transmitting a data burst 600 as shown in FIG. 6D, between chirps 602 as shown in FIG. 6A, or as shown in other arrangements in FIG. 6C and FIG. 6E-FIG. 6G. In some embodiments, the first device 402 may be configured to perform one or more LBT operations 604 based on additional or alternative metrics, such as a beam width of the first device 402. For example, the first device 402 may be configured to determine a beam width of transmissions sent on the channel to the second device 404. The first device 402 may be configured to compare the beam width to a threshold beam width (e.g., 30 degrees, 20 degrees, 45 degrees, etc.). The first device 402 may be configured to perform one or more LBT operations 604 responsive to the beam width satisfying the threshold beam width criteria (e.g., being greater than or equal to the threshold beam width).

Figure 6E:
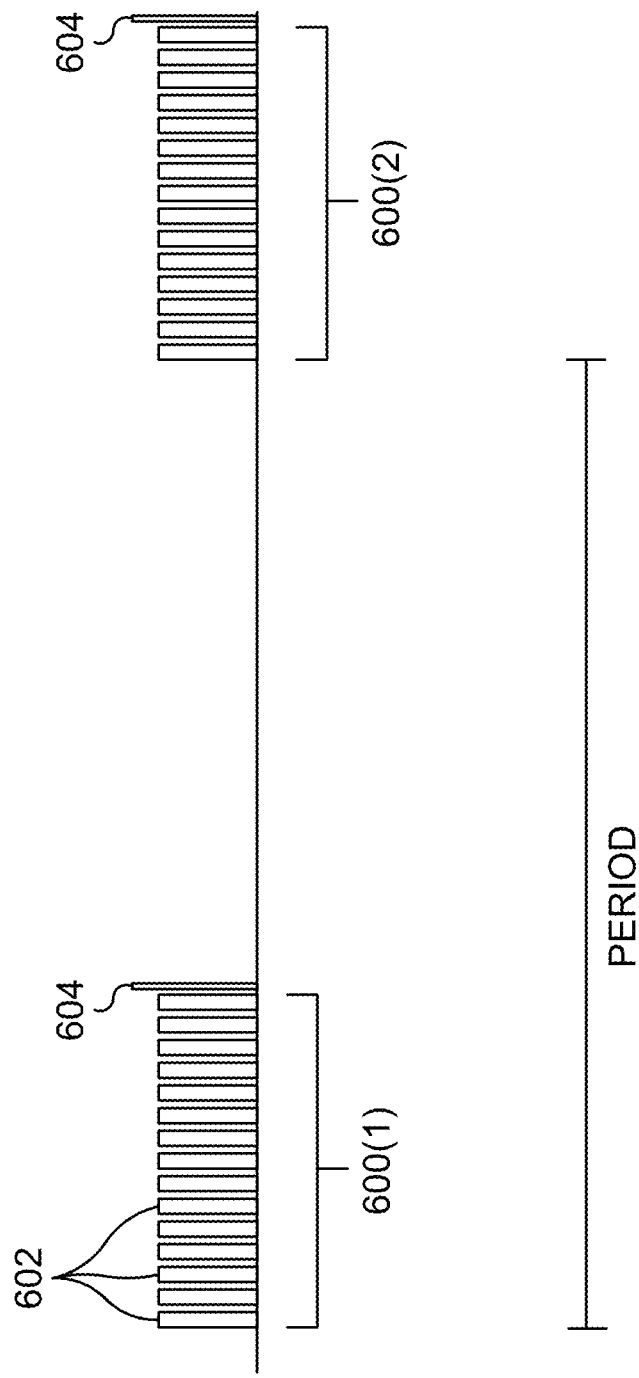
Figure 6G:
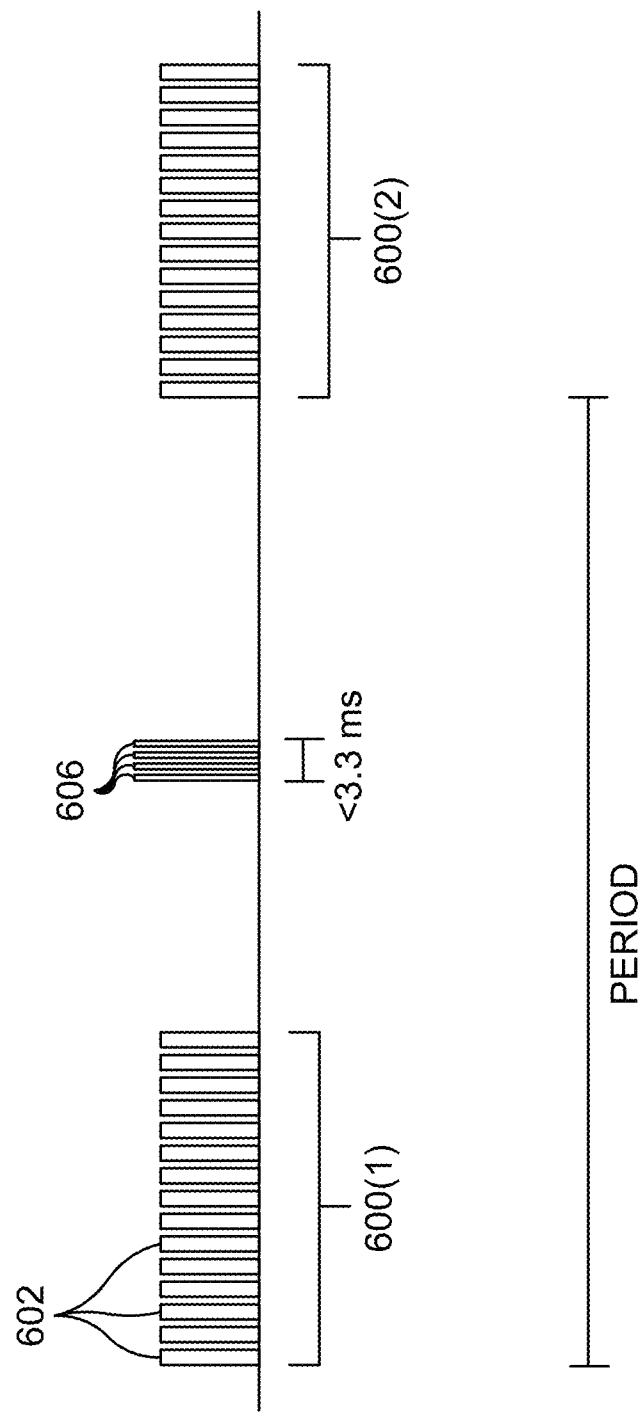

Referring specifically to FIG. 6E and FIG. 6F, in some embodiments, the first device 402 may be configured to transmit a wideband chirp following transmitting a narrowband data burst 600. A narrowband data burst may occupy ~2 GHz of bandwidth. A wideband chirp may occupy greater than ~2 GHz of bandwidth (for example, greater than 2.16 GHz, up to or approximately 7 GHz, etc.). In some embodiments, and as shown in FIG. 6F, the first device 402 may be configured to transmit a plurality (or N number) of wideband chirps to get finer resolution from the narrowband chirps. The wideband chirp occupying bandwidth larger than 2.16 GHz may be subject to a duty cycle limit or threshold criteria, whereas the narrowband chirp may not be subject to a duty cycle limit or threshold criteria. In some embodiments, the device 402 may be configured to determine a duty cycle for the data burst 600 as described above with reference to FIG. 6D. The device 402 may be configured to apply the determined duty cycle to one or more threshold criteria to determine whether to transmit narrowband or wideband chirps. If the duty cycle is, for example, greater than a threshold percentage duty cycle, the device 402 may transmit narrowband chirp(s) (e.g., chirps which occupy approximately 2 GHz of bandwidth). On the other hand, if the duty cycle is less than the threshold percentage duty cycle, the device 402 may transmit wideband chirp(s) (e.g., chirps which occupy greater than 2 GHz of bandwidth). Referring specifically to FIG. 6G, in some embodiments, the first device 402 may be configured to transmit a wideband chirp 606 on the channel between transmitting a first narrowband data burst 600(1) and transmitting a second narrowband data burst 600(2). As shown in FIG. 6G and stated briefly above, the narrowband data burst may occupy approximately 2 GHz of bandwidth. In this example, the wideband chirp 606 occupying bandwidth larger than 2.16 GHz may be subject to a duty cycle limit or threshold criteria, whereas the narrowband chirps in the data bursts 600(1), 600(2) may not be subject to a duty cycle limit or threshold criteria.

Figure 7:
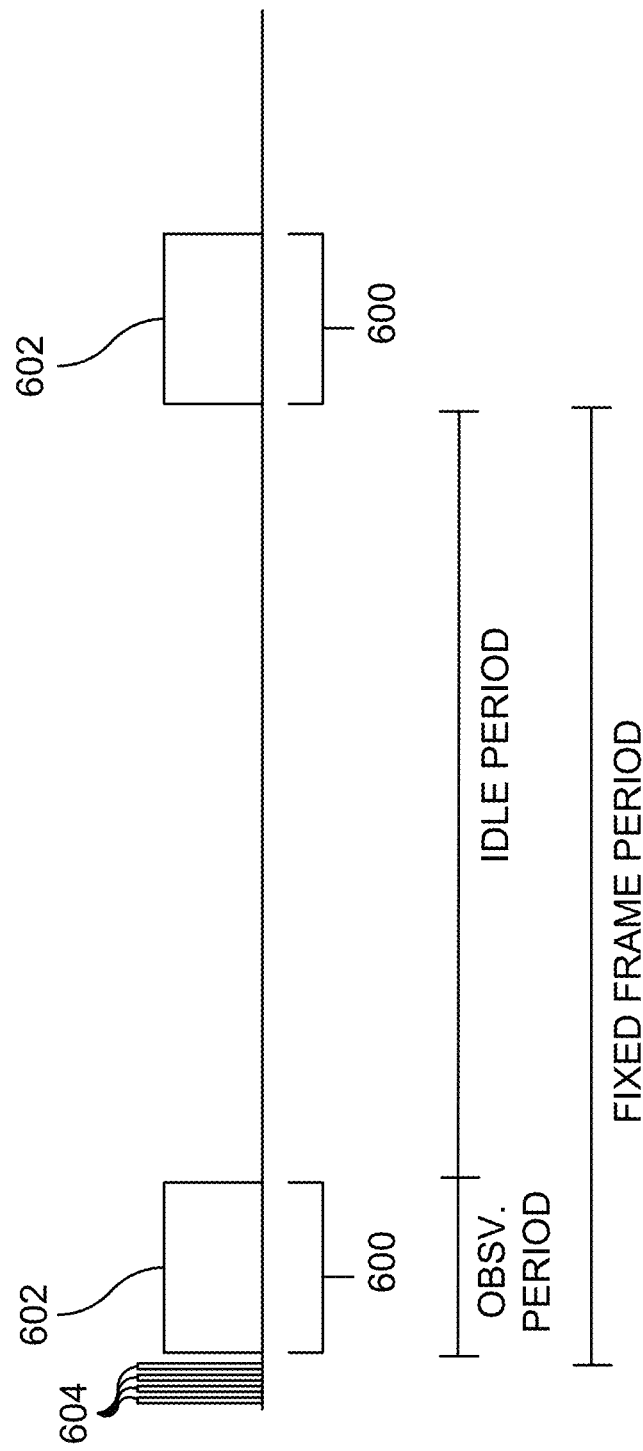
FIG. 7 is another example representation of a transmission schedule in which a device performs LBT operations, according to an example implementation of the present disclosure.

Referring now to FIG. 7, depicted is another embodiment/representation of a transmission schedule or fixed frame period in which the first device 402 may be configured to transmit data bursts 600 to the second device 404, according to an example implementation of the present disclosure. As shown in FIG. 7, in some embodiments, the first device 402 may be configured to transmit data bursts 600 each including a single chirp 602 within the observation period of the fixed frame period. In this example, the burst 600 and single chirp 602 may span the observation period, which may be set based on a percentage of the duty cycle (e.g., 10% duty cycle, for instance). In some embodiments, the first device 402 may be configured to perform one or more LBT operations 604 prior to the observation period as shown in FIG. 7. Such implementations may satisfy duty cycle requirements/thresholds/levels set by various standards while also decreasing a likelihood of interference by having a shorter observation period relative to the fixed frame period.

Figure 8:
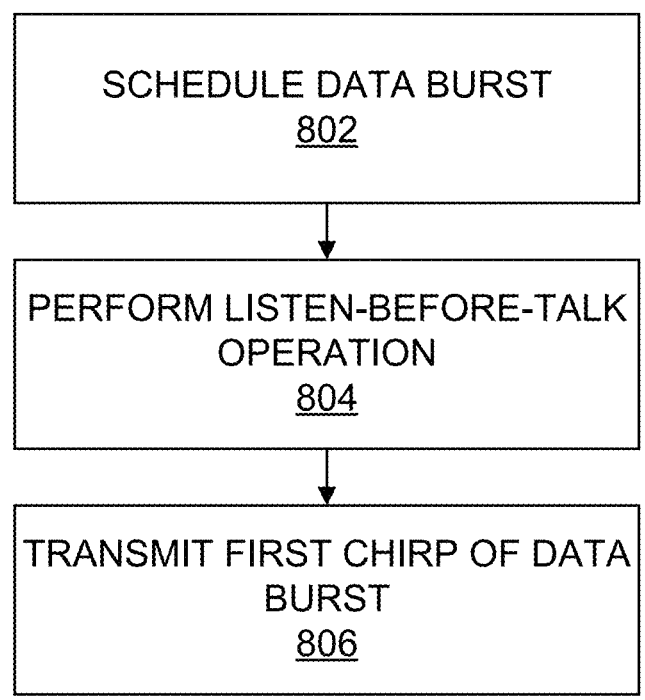
FIG. 8 is a flowchart showing a method of performing coexistence operations, according to an example implementation of the present disclosure.

Referring now to FIG. 8, depicted is a flowchart showing a method 800 for performing coexistence operations, according to an example implementation of the present disclosure. The method 800 may be performed by one or more of the wireless communication devices described herein, such as the first or second device 402, 404 described above with reference to FIG. 4 or below with reference to FIG. 9-FIG. 12, the computing device 110 or head wearable display described above with reference to FIG. 1-FIG. 2, and/or the computing system 314 described above with reference to FIG. 3, for example. As a brief overview, at step 802, a device schedules a data burst. At step 804, a device performs an LBT operation. At step 806, the device transmits a first chirp of the data burst.

At step 802, a device schedules a data burst. In some embodiments, the device may schedule a data burst including a plurality of chirps for transmitting on a channel to a second device. The device may schedule data bursts at various intervals or frequencies (e.g., according to a fixed-frame period). The device may schedule the data burst responsive to negotiating, determining, setting, or otherwise establishing a channel with the second device. In some embodiments, the channel may be within a frequency band/range/spectrum, such as the 60 GHz frequency band. The data burst may include a plurality of chirps. Each chirp may be or include a radar signal sent from the device to the second device. The chirps may be used for determining a position, location, orientation, velocity, etc., of the second device.

At step 804, a device performs an LBT operation. The device may perform the LBT operation on the channel between the device and the second device. The device may perform the LBT operation on the channel to determine/check/detect/confirm/monitor whether the channel is available. The device may perform the LBT operation responsive to scheduling the data burst and/or responsive to a result of the LBT operation (e.g., determining that the channel is available/clear). The device may perform the LBT operation prior to transmitting a first chirp of the plurality of chirps. In some embodiments, the device may determine that the channel is available (e.g., is not occupied by any transmission, signal and/or noise) responsive to not detecting any interference on the channel while performing (or as part of performing the LBT operation). In some embodiments, the device may determine that the channel is available responsive to any detected interference satisfying a threshold criteria (e.g., being less than or equal to a threshold interference level). For example, the device may compare a signal strength of the detected interference to the threshold interference level, and determine that the channel is available responsive to the signal strength being less than (or equal to) the threshold interference level.

In some embodiments, the device may perform a plurality of LBT operations at step 804. For example, the device may perform up to a predefined number of LBT operations (initiated at a series of time instances) on the channel to determine whether the channel is available (e.g., in an attempt to find a time instance at which the channel is available). The predefined number of LBT operations may be set by various standards relating to the device or the channel. In some embodiments, the device may perform a first LBT operation, detect interference which does not satisfy the threshold criteria, and perform one or more additional LBT operations (up to the predefined number of LBT operations) until the device determines that the channel is available. Once the device determines that the channel is available, the method 800 may proceed to step 806.

In some embodiments, the device may perform or initiate the LBT operation(s) based on one or more metrics relating to the device. In some embodiments, the device may perform or initiate the LBT operation(s) based on a duty cycle for the data burst. The device may determine a duty cycle for the data burst based on a comparison of an observation period (e.g., which includes the burst) to a fixed frame period. The device may compare the duty cycle to a threshold duty cycle. The device may initiate or otherwise perform the LBT operation(s) based on the duty cycle. For example, the device may initiate the LBT operation(s) responsive to the duty cycle being greater than or equal to the threshold duty cycle. In some embodiments, the device may perform or initiate the LBT operation(s) based on a beam width for the device. The device may determine or identify the beam width based on or using data stored, maintained, configured or otherwise accessible by the device. The data may include, for example, manufacturing or device specifications relating to the wireless network device or hardware for the device. The device may compare the beam width to a threshold beam width. The device may initiate or otherwise perform the LBT operation(s) responsive to the beam width satisfying a threshold criteria (e.g., being greater than or equal to a threshold beam width, for instance).

At step 806, the device transmits a first chirp of the data burst. In some embodiments, the device may transmit the first chirp on the channel responsive to performing the LBT operation at step 804. The device may transmit the first chirp responsive to determining that the channel is available (while performing or as part of performing the LBT operation), either by the device not detecting any interference (e.g., signal/noise/transmission in the channel) or by any detected interference satisfying the threshold criteria.

In some embodiments, the device may select a bandwidth for the chirp (e.g., a narrowband chirp or a wideband chirp) for which to transmit the first chirp. The device may select the bandwidth based on the duty cycle determined for the data burst. In some embodiments, the device may apply the duty cycle to a threshold criteria. For example, the device may determine whether the duty cycle satisfies the threshold criteria (e.g., less than or equal to a percentage duty cycle). The device may select the bandwidth for the chirp based on whether the duty cycle satisfies the threshold criteria. For instance, the device may select a narrowband bandwidth for transmitting the first chirp responsive to the duty cycle not satisfying the threshold criteria (e.g., being greater than the threshold percentage duty cycle). On the other hand, the device may select a wideband bandwidth for transmitting the first chirp responsive to the duty cycle satisfying the threshold criteria (e.g., being less than the threshold percentage duty cycle). As such, transmissions of wideband chirps by the device may be subject to duty cycle threshold criteria.

In some embodiments, the device may transmit each of the chirps of the data burst at step 806. For instance, once the device determines that the channel is available, the device may transmit the data burst including each of the chirps of the data burst on the channel to the second device. In some embodiments, the device repeat steps 802 and 804 for each chirp of the data burst. For instance, the device may perform a second LBT operation on the channel following transmitting the first chirp and prior to transmitting a second chirp of the plurality of chirps. The device may determine that the channel is available (or still available) responsive to or as part of performing the second LBT operation. The device may transmit the second chirp responsive to performing the second LBT operation. The device may repeat steps 802 and 804 for the third through N-th chirp. In other words, the device may perform a respective LBT operation on the channel (to determine that the channel is available/clear at the respective time instance) prior to transmitting a respective one of the plurality of chirps of the data burst.

In some embodiments, after the device transmits the last chirp of the data burst, the device may enter an idle state or period (e.g., in which the device does not transmit any chirps to the second device). The device may schedule a second data burst following the idle period. In some embodiments, as part of or following scheduling the second data burst, the device may perform additional LBT operations on the channel. For example, the device may perform one or more additional LBT operations on the channel after the idle period, prior to entering the idle period and after sending the last chirp of the first data burst, etc. The device may transmit at least one of the second chirps of the second data burst responsive to performing the additional LBT operations. In some embodiments, the device may transmit the second data burst (or at least one of the second chirps of the second data burst) responsive to performing the LBT operation (to determine that the channel is available/clear at the corresponding time instance), prior to transmitting the first chirp of the first data burst. In other words, the device may in some embodiments rely on the LBT operation performed prior to a first data burst indicating that a channel is available for sending chirps of a second data burst.

Figure 9:
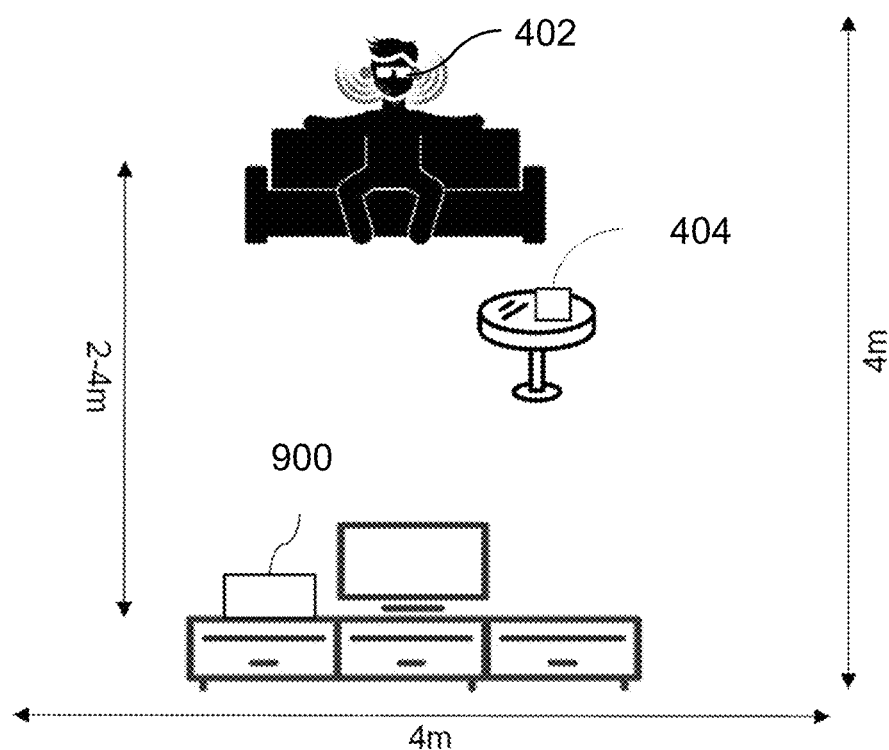
FIG. 9 is a diagram of a user environment including a plurality of devices, according to an example implementation of the present disclosure.
Figure 10:
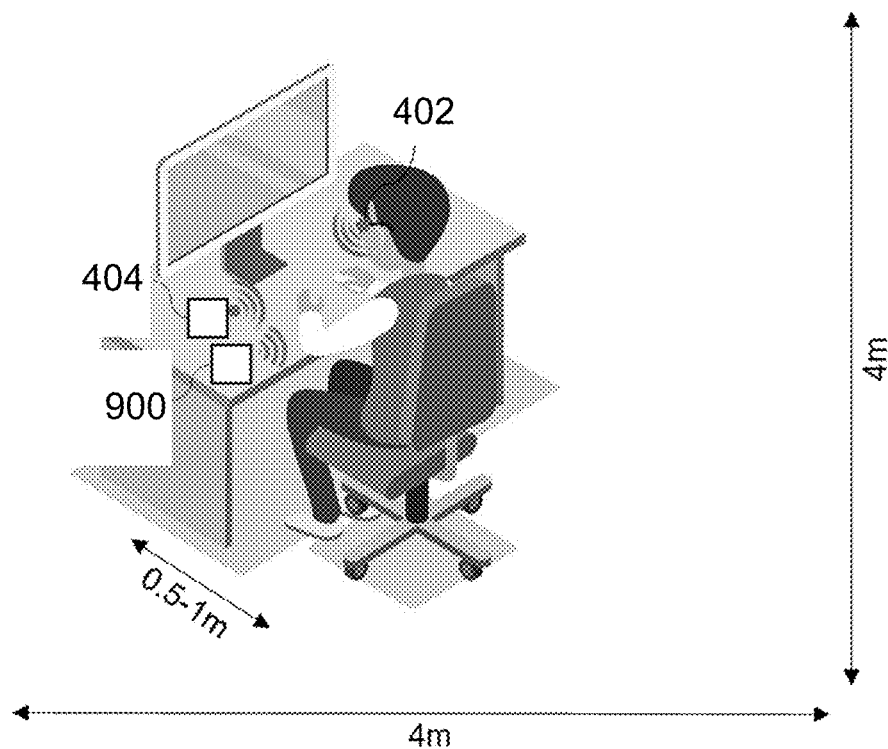
FIG. 10 is a diagram of a user environment including a plurality of devices, according to an example implementation of the present disclosure.
Figure 11:
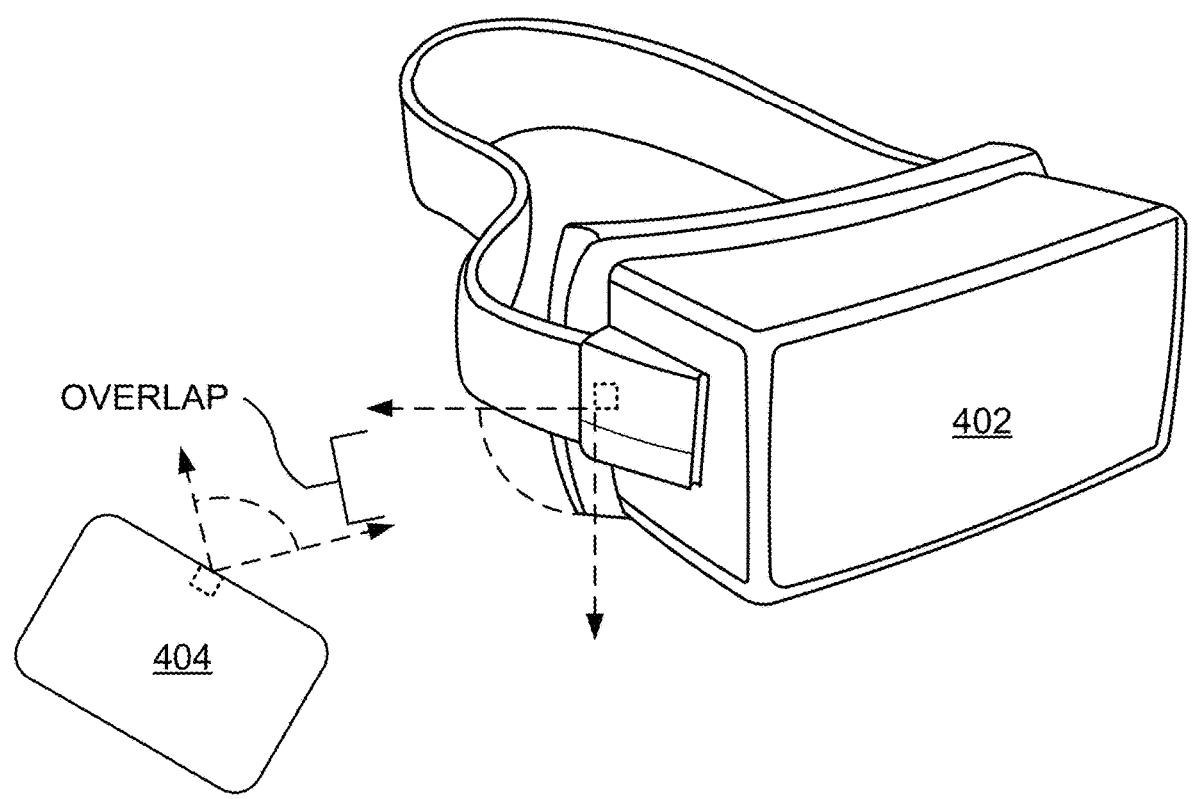
FIG. 11 is a diagram of an environment including a first and second device, according to an example implementation of the present disclosure.
Figure 12:
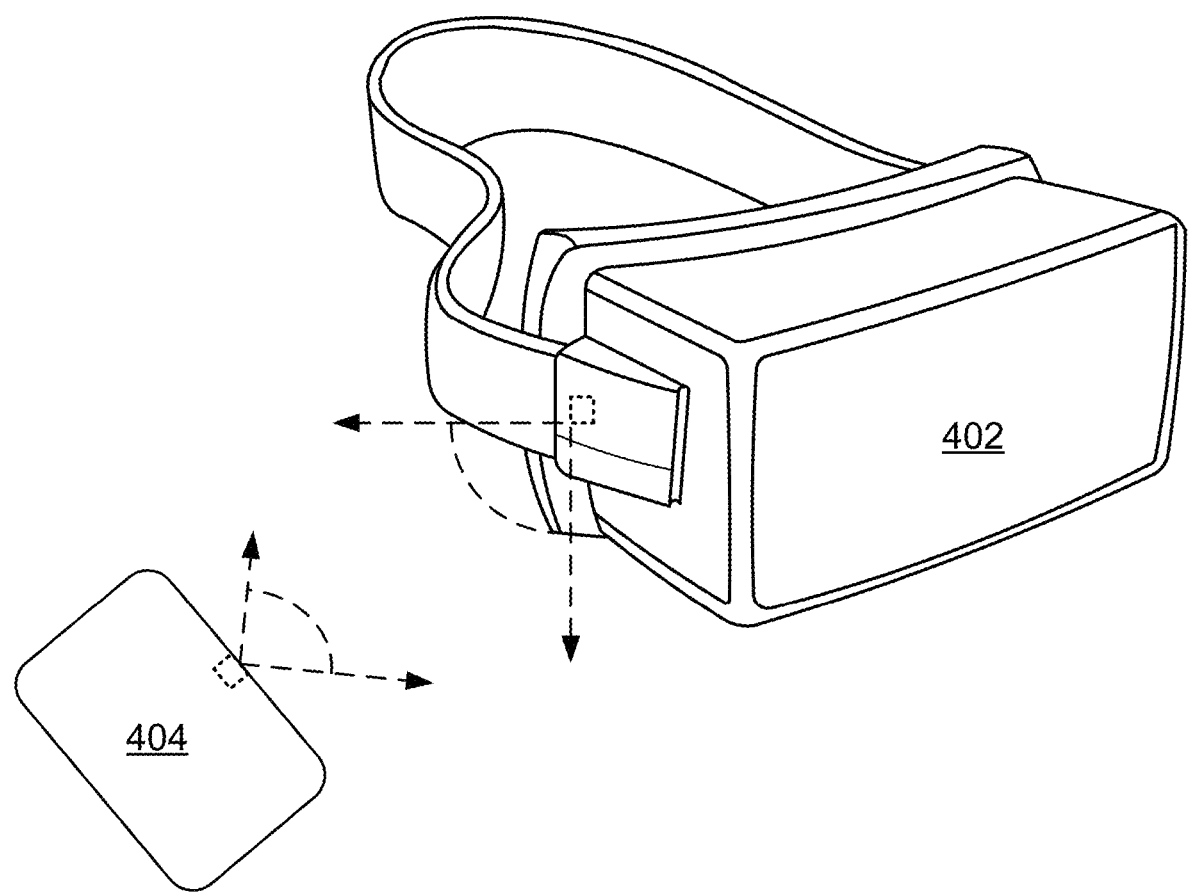
FIG. 12 is another diagram of the environment of FIG. 11 including the first and second device, according to an example implementation of the present disclosure.

Referring now to FIG. 9-FIG. 12, depicted are various use cases in which the systems and methods described herein may be practiced. Specifically, FIG. 9 shows a user/living environment 900 including a plurality of devices, FIG. 10 shows a user/work environment 1000 including a plurality of devices, and FIG. 11-FIG. 12 show an environment 1100 including a first and second device, according to example implementations of the present disclosure. The devices shown in the environments 900, 1000, 1100 may include the first device 402, second device 404, and one or more other devices 900. The first device 402 may perform ranging with the second device 404 by transmitting various data bursts to the second device 404 on a negotiated or established channel. The first device 402 may perform ranging with the second device 404 to determine a relative position or orientation of the second device 404.

In some instances, the other device 900 may be operating on or otherwise transmitting data on a channel which is near (or overlaps) in frequency to the channel used by the first and second device 402, 404. In such instances, the other device 900 may cause interference at various times to the channel used by the first and second device 402, 404. Additionally, and referring specifically to FIG. 11 as compared to FIG. 12, where the first and second devices 402, 404 are not in alignment (e.g., alignment shown in FIG. 12) the beam width of the devices 402, 404 may partially overlap. Since the beam widths partially overlap, the devices 402, 404 may be exposed to interference from other device(s) 900 outside of the overlapping portion of the beam width.

According to the systems and methods of the present solution, the first device 402 and second device 404 may perform various LBT operations as described herein to determine that a channel used by the devices 402, 404 is available. Where the devices 402, 404 identify or detect interference from the other device 900, the devices 402, 404 may switch channels, wait to perform transmission until the interference is no longer present/detected/identified, etc. Such implementations and embodiments may provide for more accurate ranging and less interference on a particular channel, particularly where multiple devices within an environment are co-operating or co-existing within a particular frequency band (such as the 60 GHz band).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general or special purpose computer or other machine with a processor. By way of example, such machine-readable media can comprise RAM, ROM, EPROM, EEPROM, or other optical disk storage, magnetic disk storage, or other magnetic storage devices, or any other medium which can be used to carry or store desired program code in the form of machine-executable instructions or data structures and which can be accessed by a general or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings, and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
    scheduling, by a first wireless communication device, a data burst comprising a plurality of chirps for transmitting on a channel to a second device;
    determining, by the first wireless communication device, a duty cycle for the data burst:
    performing, by the first wireless communication device, according to the duty cycle, a listen-before-talk (LBT) operation on the channel between the first wireless communication device and the second device to determine that the channel is available, prior to transmitting a first chirp of the plurality of chirps; and
    transmitting, by the first wireless communication device, the first chirp on the channel responsive to performing the LBT operation.

2. The method of claim 1, further comprising:
    performing, by the first wireless communication device, a second LBT operation on the channel following the transmitting of the first chirp and prior to transmitting a second chirp of the plurality of chirps; and
    transmitting, by the first wireless communication device, the second chirp of the plurality of chirps responsive to performing the second LBT function.

3. The method of claim 2, further comprising performing, by the first wireless communication device, a respective LBT operation on the channel prior to transmitting each of the plurality of chirps of the data burst.

4. The method of claim 1, wherein performing the LBT function prior to transmitting the first chirp comprises performing up to a predefined number of LBT operations on the channel to determine that the channel is available, prior to transmitting the first chirp of the plurality of chirps.

5. The method of claim 1, wherein transmitting the first chirp on the channel comprises: transmitting the data burst including each of the plurality of chirps on the channel, responsive to determining that the channel is available.

6. The method of claim 1, further comprising comparing, by the first wireless communication device, the duty cycle to a threshold, wherein the LBT function is initiated responsive to the duty cycle being greater than or equal to the threshold.

7. The method of claim 1, wherein transmitting the first chirp on the channel responsive to performing the LBT function comprises: transmitting, by the first wireless communication device, the first chirp on the channel responsive to determining that the channel is clear of interference within a threshold criteria.

8. The method of claim 1, wherein performing the LBT function on the channel between the first wireless communication device and the second device is based on a beam width for the first wireless communication device satisfying a threshold criteria.

9. The method of claim 1, wherein the data burst is a first data burst comprising a first plurality of chirps, the method further comprising:
    scheduling, by the first wireless communication device, a second data burst comprising a second plurality of chirps for transmitting on the channel.

10. The method of claim 6, further comprising:
    performing, by the first wireless communication device, a second LBT operation on the channel between the first wireless communication device and the second device; and
    transmitting, by the first wireless communication device, at least one of the second plurality of chirps on the channel responsive to determining that the channel is available.

11. The method of claim 9, further comprising:
    transmitting, by the first wireless communication device, at least one of the second plurality of chirps on the channel, responsive to performing the LBT operation to determine that the channel is available prior to transmitting the first chirp of the first plurality of chirps.

12. A first device comprising:
    a wireless communication device configured to communicate data with a second device located in an environment of the first device; and
    one or more processors configured to:
        schedule a data burst comprising a plurality of chirps for transmitting on a channel to the second device;
        determine a duty cycle for the data burst;
        perform, according to the duty cycle, a listen-before-talk (LBT) operation on the channel between the first device and the second device to determine that the channel is available, prior to transmitting a first chirp of the plurality of chirps; and
        transmit, via the wireless communication device, the first chirp on the channel responsive to performing the LBT operation.

13. The first device of claim 12, wherein the one or more processors are further configured to:
    perform a respective LBT operation on the channel prior to transmitting each of the plurality of chirps of the data burst; and transmit, via the wireless communication device, each of the plurality of bursts to the second device responsive to performing the respective LBT operation on the channel.

14. The first device of claim 12, wherein performing the LBT function prior to transmitting the first chirp comprises a performing up to a predefined number of LBT operations on the channel to determine that the channel is available, prior to transmitting the first chirp of the plurality of chirps.

15. The first device of claim 12, wherein transmitting the first chirp on the channel comprises: transmitting the data burst including each of the plurality of chirps on the channel, responsive to determining that the channel is available.

16. The first device of claim 12, wherein the one or more processors are further configured to:

compare the duty cycle to a threshold, wherein the LBT function is initiated responsive to the duty cycle being greater than or equal to the threshold.

17. The first device of claim 12, wherein transmitting the first chirp on the channel responsive to performing the LBT function comprises transmitting, via the wireless communication device, the first chirp on the channel responsive to determining that the channel is clear of interference within a threshold criteria.

18. The first device of claim 12, wherein performing the LBT function on the channel between the first device and the second device is based on a beam width for the first device satisfying a threshold criteria.

19. A non-transitory computer readable medium storing instructions that, when executed by one or more processors, cause the one or more processors to:

schedule, for a first wireless communication device, a data burst comprising a plurality of chirps for transmitting on a channel to a second device;

determine a duty cycle for the data burst;

perform, according to the duty cycle, a listen-before-talk (LBT) operation on the channel between the first device and the second device to determine that the channel is available, prior to transmitting a first chirp of the plurality of chirps; and transmit, via the first wireless communication device, the first chirp on the channel responsive to performing the LBT operation.

\* \* \* \* \*